US008319483B2

(12) United States Patent
Fishelov et al.

(10) Patent No.: US 8,319,483 B2
(45) Date of Patent: Nov. 27, 2012

(54) DIGITAL AVERAGE INPUT CURRENT CONTROL IN POWER CONVERTER

(75) Inventors: Amir Fishelov, Tel Aviv (IL); Meir Gazit, Ashkelon (IL); Nikolay Radimov, Holon (IL)

(73) Assignee: Solaredge Technologies Ltd., Herzelia (IL)

( * ) Notice: Subject to any disclaimer, the term of this patent is extended or adjusted under 35 U.S.C. 154(b) by 656 days.

(21) Appl. No.: 12/187,335

(22) Filed: Aug. 6, 2008

(65) Prior Publication Data

US 2009/0039852 A1      Feb. 12, 2009

Related U.S. Application Data

(60) Provisional application No. 60/954,261, filed on Aug. 6, 2007, provisional application No. 60/954,354, filed on Aug. 7, 2007.

(51) Int. Cl.
*G05F 1/40* (2006.01)
*G05F 1/613* (2006.01)

(52) U.S. Cl. ........................................ 323/271; 323/225

(58) Field of Classification Search .......... 323/222–225, 323/268, 271, 282–285, 299, 301
See application file for complete search history.

(56) References Cited

U.S. PATENT DOCUMENTS

| | | | |
|---|---|---|---|
| 3,369,210 A | 2/1968 | Menickella |
| 3,596,229 A | 7/1971 | Hohorst |
| 4,060,757 A | 11/1977 | McMurray |
| 4,101,816 A | 7/1978 | Shepter |
| 4,171,861 A | 10/1979 | Hohorst |
| 4,452,867 A | 6/1984 | Conforti |
| 4,460,232 A | 7/1984 | Sotolongo |
| 4,481,654 A | 11/1984 | Daniels et al. |
| 4,554,515 A | 11/1985 | Burson et al. |
| 4,598,330 A | 7/1986 | Woodworth |
| 4,623,753 A | 11/1986 | Feldman et al. |
| 4,637,677 A | 1/1987 | Barkus |
| 4,641,042 A | 2/1987 | Miyazawa |
| 4,641,079 A | 2/1987 | Kato et al. |

(Continued)

FOREIGN PATENT DOCUMENTS

CN          1309451 A      8/2001

(Continued)

OTHER PUBLICATIONS

International Search Report for PCT/IB2007/004610 dated Feb. 23, 2009.

(Continued)

*Primary Examiner* — Matthew Nguyen
(74) *Attorney, Agent, or Firm* — Banner & Witcoff, Ltd.

(57) ABSTRACT

A digital average-input current-mode control loop for a DC/DC power converter. The power converter may be, for example, a buck converter, boost converter, or cascaded buck-boost converter. The purpose of the proposed control loop is to set the average converter input current to the requested current. Controlling the average input current can be relevant for various applications such as power factor correction (PFC), photovoltaic converters, and more. The method is based on predicting the inductor current based on measuring the input voltage, the output voltage, and the inductor current. A fast cycle-by-cycle control loop may be implemented. The conversion method is described for three different modes. For each mode a different control loop is used to control the average input current, and the control loop for each of the different modes is described. Finally, the algorithm for switching between the modes is disclosed.

4 Claims, 4 Drawing Sheets

U.S. PATENT DOCUMENTS

| | | |
|---|---|---|
| 4,644,458 A | 2/1987 | Harafuji et al. |
| 4,652,770 A | 3/1987 | Kumano |
| 4,783,728 A | 11/1988 | Hoffman |
| 4,868,379 A | 9/1989 | West |
| 4,888,063 A | 12/1989 | Powell |
| 4,888,702 A | 12/1989 | Gerken et al. |
| 4,899,269 A | 2/1990 | Rouzies |
| 4,903,851 A | 2/1990 | Slough |
| 4,987,360 A | 1/1991 | Thompson |
| 5,045,988 A | 9/1991 | Gritter et al. |
| 5,081,558 A | 1/1992 | Mahler |
| 5,191,519 A | 3/1993 | Kawakami |
| 5,280,232 A | 1/1994 | Kohl et al. |
| 5,327,071 A | 7/1994 | Frederick et al. |
| 5,345,375 A | 9/1994 | Mohan |
| 5,402,060 A | 3/1995 | Erisman |
| 5,446,645 A | 8/1995 | Shirahama et al. |
| 5,460,546 A | 10/1995 | Kunishi et al. |
| 5,493,154 A | 2/1996 | Smith et al. |
| 5,497,289 A | 3/1996 | Sugishima et al. |
| 5,517,378 A | 5/1996 | Asplund et al. |
| 5,548,504 A | 8/1996 | Takehara |
| 5,604,430 A | 2/1997 | Decker et al. |
| 5,616,913 A | 4/1997 | Litterst |
| 5,644,219 A | 7/1997 | Kurokawa |
| 5,646,501 A | 7/1997 | Fishman et al. |
| 5,659,465 A | 8/1997 | Flack et al. |
| 5,686,766 A | 11/1997 | Tamechika |
| 5,773,963 A | 6/1998 | Blanc et al. |
| 5,777,515 A | 7/1998 | Kimura |
| 5,780,092 A | 7/1998 | Agbo et al. |
| 5,798,631 A | 8/1998 | Spee et al. |
| 5,801,519 A | 9/1998 | Midya et al. |
| 5,804,894 A | 9/1998 | Leeson et al. |
| 5,821,734 A | 10/1998 | Faulk |
| 5,822,186 A | 10/1998 | Bull et al. |
| 5,838,148 A | 11/1998 | Kurokami et al. |
| 5,869,956 A | 2/1999 | Nagao et al. |
| 5,873,738 A | 2/1999 | Shimada et al. |
| 5,886,890 A | 3/1999 | Ishida et al. |
| 5,892,354 A | 4/1999 | Nagao et al. |
| 5,905,645 A | 5/1999 | Cross |
| 5,919,314 A | 7/1999 | Kim |
| 5,923,158 A | 7/1999 | Kurokami et al. |
| 5,932,994 A | 8/1999 | Jo et al. |
| 5,933,327 A | 8/1999 | Leighton et al. |
| 5,945,806 A | 8/1999 | Faulk |
| 5,949,668 A | 9/1999 | Schweighofer |
| 5,963,010 A | 10/1999 | Hayashi et al. |
| 5,990,659 A | 11/1999 | Frannhagen |
| 6,031,736 A | 2/2000 | Takehara et al. |
| 6,038,148 A | 3/2000 | Farrington et al. |
| 6,046,919 A | 4/2000 | Madenokouji et al. |
| 6,050,779 A | 4/2000 | Nagao et al. |
| 6,078,511 A | 6/2000 | Fasullo et al. |
| 6,081,104 A | 6/2000 | Kern |
| 6,082,122 A | 7/2000 | Madenokouji et al. |
| 6,105,317 A | 8/2000 | Tomiuchi et al. |
| 6,111,188 A | 8/2000 | Kurokami et al. |
| 6,111,391 A | 8/2000 | Cullen |
| 6,111,767 A | 8/2000 | Handleman |
| 6,163,086 A | 12/2000 | Choo |
| 6,166,455 A | 12/2000 | Li |
| 6,166,527 A | 12/2000 | Dwelley et al. |
| 6,169,678 B1 | 1/2001 | Kondo et al. |
| 6,219,623 B1 | 4/2001 | Wills |
| 6,255,360 B1 | 7/2001 | Domschke et al. |
| 6,256,234 B1 | 7/2001 | Keeth et al. |
| 6,259,234 B1 | 7/2001 | Perol |
| 6,262,558 B1 | 7/2001 | Weinberg |
| 6,285,572 B1 | 9/2001 | Onizuka et al. |
| 6,301,128 B1 | 10/2001 | Jang et al. |
| 6,304,065 B1 | 10/2001 | Wittenbreder |
| 6,320,769 B2 | 11/2001 | Kurokami et al. |
| 6,339,538 B1 | 1/2002 | Handleman |
| 6,351,130 B1 | 2/2002 | Preiser et al. |
| 6,369,462 B1 | 4/2002 | Siri |
| 6,380,719 B2 | 4/2002 | Underwood et al. |
| 6,396,170 B1 | 5/2002 | Laufenberg et al. |
| 6,433,522 B1 | 8/2002 | Siri |
| 6,448,489 B2 | 9/2002 | Kimura et al. |
| 6,452,814 B1 | 9/2002 | Wittenbreder |
| 6,493,246 B2 | 12/2002 | Suzui et al. |
| 6,507,176 B2 | 1/2003 | Wittenbreder, Jr. |
| 6,531,848 B1 | 3/2003 | Chitsazan et al. |
| 6,545,211 B1 | 4/2003 | Mimura |
| 6,548,205 B2 | 4/2003 | Leung et al. |
| 6,590,793 B1 | 7/2003 | Nagao et al. |
| 6,593,521 B2 | 7/2003 | Kobayashi |
| 6,608,468 B2 | 8/2003 | Nagase |
| 6,611,441 B2 | 8/2003 | Kurokami et al. |
| 6,628,011 B2 | 9/2003 | Droppo et al. |
| 6,650,031 B1 | 11/2003 | Goldack |
| 6,650,560 B2 | 11/2003 | MacDonald et al. |
| 6,653,549 B2 | 11/2003 | Matsushita et al. |
| 6,672,018 B2 | 1/2004 | Shingleton |
| 6,678,174 B2 | 1/2004 | Suzui et al. |
| 6,690,590 B2 | 2/2004 | Stamenic et al. |
| 6,731,136 B2 | 5/2004 | Knee |
| 6,738,692 B2 | 5/2004 | Schienbein et al. |
| 6,765,315 B2 | 7/2004 | Hammerstrom et al. |
| 6,768,047 B2 | 7/2004 | Chang et al. |
| 6,788,033 B2 | 9/2004 | Vinciarelli |
| 6,795,318 B2 | 9/2004 | Haas et al. |
| 6,801,442 B2 | 10/2004 | Suzui et al. |
| 6,850,074 B2 | 2/2005 | Adams et al. |
| 6,882,131 B1 | 4/2005 | Takada et al. |
| 6,914,418 B2 | 7/2005 | Sung |
| 6,919,714 B2 | 7/2005 | Delepaut |
| 6,927,955 B2 | 8/2005 | Suzui et al. |
| 6,933,627 B2 | 8/2005 | Wilhelm |
| 6,936,995 B2 | 8/2005 | Kapsokavathis et al. |
| 6,950,323 B2 | 9/2005 | Achleitner et al. |
| 6,963,147 B2 | 11/2005 | Kurokami et al. |
| 6,984,967 B2 * | 1/2006 | Notman .................. 323/282 |
| 6,984,970 B2 | 1/2006 | Capel |
| 7,030,597 B2 | 4/2006 | Bruno et al. |
| 7,031,176 B2 | 4/2006 | Kotsopoulos et al. |
| 7,042,195 B2 | 5/2006 | Tsunetsugu et al. |
| 7,046,531 B2 | 5/2006 | Zocchi et al. |
| 7,053,506 B2 | 5/2006 | Alonso et al. |
| 7,072,194 B2 | 7/2006 | Nayar et al. |
| 7,079,406 B2 | 7/2006 | Kurokami et al. |
| 7,087,332 B2 | 8/2006 | Harris |
| 7,090,509 B1 | 8/2006 | Gilliland et al. |
| 7,091,707 B2 | 8/2006 | Cutler |
| 7,097,516 B2 | 8/2006 | Werner et al. |
| 7,126,053 B2 | 10/2006 | Kurokami et al. |
| 7,126,294 B2 | 10/2006 | Minami et al. |
| 7,138,786 B2 | 11/2006 | Ishigaki et al. |
| 7,148,669 B2 | 12/2006 | Maksimovic et al. |
| 7,158,359 B2 | 1/2007 | Bertele et al. |
| 7,158,395 B2 | 1/2007 | Deng et al. |
| 7,174,973 B1 | 2/2007 | Lysaght |
| 7,193,872 B2 | 3/2007 | Siri |
| 7,218,541 B2 | 5/2007 | Price et al. |
| 7,248,946 B2 | 7/2007 | Bashaw et al. |
| 7,256,566 B2 | 8/2007 | Bhavaraju et al. |
| 7,277,304 B2 | 10/2007 | Stancu et al. |
| 7,282,814 B2 | 10/2007 | Jacobs |
| 7,291,036 B1 | 11/2007 | Daily et al. |
| RE39,976 E | 1/2008 | Schiff et al. |
| 7,336,056 B1 * | 2/2008 | Dening .................. 323/222 |
| 7,348,802 B2 | 3/2008 | Kasanyal et al. |
| 7,352,154 B2 | 4/2008 | Cook |
| 7,371,963 B2 | 5/2008 | Suenaga et al. |
| 7,372,712 B2 | 5/2008 | Stancu et al. |
| 7,385,380 B2 | 6/2008 | Ishigaki et al. |
| 7,385,833 B2 | 6/2008 | Keung |
| 7,394,237 B2 | 7/2008 | Chou et al. |
| 7,420,815 B2 | 9/2008 | Love |
| 7,435,134 B2 | 10/2008 | Lenox |
| 7,435,897 B2 | 10/2008 | Russell |
| 7,471,014 B2 | 12/2008 | Lum et al. |
| 7,504,811 B2 | 3/2009 | Watanabe et al. |
| 7,589,437 B2 | 9/2009 | Henne et al. |
| 7,600,349 B2 | 10/2009 | Liebendorfer |

| Patent/Publication | Date | Inventor(s) |
|---|---|---|
| 7,602,080 B1 | 10/2009 | Hadar et al. |
| 7,605,498 B2 | 10/2009 | Ledenev et al. |
| 7,646,116 B2 | 1/2010 | Batarseh et al. |
| 7,719,140 B2 | 5/2010 | Ledenev et al. |
| 7,748,175 B2 | 7/2010 | Liebendorfer |
| 7,759,575 B2 | 7/2010 | Jones et al. |
| 7,763,807 B2 | 7/2010 | Richter |
| 7,780,472 B2 | 8/2010 | Lenox |
| 7,782,031 B2 | 8/2010 | Qiu et al. |
| 7,787,273 B2 | 8/2010 | Lu et al. |
| 7,804,282 B2 * | 9/2010 | Bertele ............... 323/222 |
| 7,812,701 B2 | 10/2010 | Lee et al. |
| 7,839,022 B2 | 11/2010 | Wolfs |
| 7,843,085 B2 | 11/2010 | Ledenev et al. |
| 7,868,599 B2 | 1/2011 | Rahman et al. |
| 7,880,334 B2 | 2/2011 | Evans et al. |
| 7,893,346 B2 | 2/2011 | Nachamkin et al. |
| 7,900,361 B2 | 3/2011 | Adest et al. |
| 7,919,953 B2 | 4/2011 | Porter et al. |
| 7,948,221 B2 | 5/2011 | Watanabe et al. |
| 7,952,897 B2 | 5/2011 | Nocentini et al. |
| 7,960,650 B2 | 6/2011 | Richter et al. |
| 7,960,950 B2 | 6/2011 | Glovinsky |
| 8,003,885 B2 | 8/2011 | Richter et al. |
| 8,004,116 B2 | 8/2011 | Ledenev et al. |
| 8,004,117 B2 | 8/2011 | Adest et al. |
| 8,013,472 B2 | 9/2011 | Adest et al. |
| 8,077,437 B2 | 12/2011 | Mumtaz et al. |
| 8,093,756 B2 | 1/2012 | Porter et al. |
| 8,093,757 B2 | 1/2012 | Wolfs |
| 8,111,052 B2 | 2/2012 | Glovinsky |
| 2001/0023703 A1 | 9/2001 | Kondo et al. |
| 2002/0044473 A1 | 4/2002 | Toyomura et al. |
| 2002/0056089 A1 | 5/2002 | Houston |
| 2003/0058593 A1 | 3/2003 | Bertele et al. |
| 2003/0066076 A1 | 4/2003 | Minahan |
| 2003/0075211 A1 | 4/2003 | Makita et al. |
| 2003/0080741 A1 | 5/2003 | LeRow et al. |
| 2003/0214274 A1 | 11/2003 | Lethellier |
| 2004/0041548 A1 | 3/2004 | Perry |
| 2004/0061527 A1 | 4/2004 | Knee |
| 2004/0125618 A1 | 7/2004 | De Rooij |
| 2004/0140719 A1 | 7/2004 | Vulih et al. |
| 2004/0169499 A1 | 9/2004 | Huang et al. |
| 2004/0201279 A1 | 10/2004 | Templeton |
| 2004/0201933 A1 | 10/2004 | Blanc |
| 2004/0246226 A1 | 12/2004 | Moon |
| 2005/0002214 A1 | 1/2005 | Deng et al. |
| 2005/0005785 A1 | 1/2005 | Poss et al. |
| 2005/0017697 A1 | 1/2005 | Capel |
| 2005/0057214 A1 | 3/2005 | Matan |
| 2005/0057215 A1 | 3/2005 | Matan |
| 2005/0068820 A1 | 3/2005 | Radosevich et al. |
| 2005/0099138 A1 | 5/2005 | Wilhelm |
| 2005/0103376 A1 | 5/2005 | Matsushita et al. |
| 2005/0105224 A1 | 5/2005 | Nishi |
| 2005/0162018 A1 | 7/2005 | Realmuto et al. |
| 2005/0172995 A1 | 8/2005 | Rohrig et al. |
| 2005/0226017 A1 | 10/2005 | Kotsopoulos et al. |
| 2006/0001406 A1 | 1/2006 | Matan |
| 2006/0017327 A1 | 1/2006 | Siri et al. |
| 2006/0034106 A1 | 2/2006 | Johnson |
| 2006/0038692 A1 | 2/2006 | Schnetker |
| 2006/0053447 A1 | 3/2006 | Krzyzanowski et al. |
| 2006/0066349 A1 | 3/2006 | Murakami |
| 2006/0068239 A1 | 3/2006 | Norimatsu et al. |
| 2006/0108979 A1 | 5/2006 | Daniel et al. |
| 2006/0113843 A1 | 6/2006 | Beveridge |
| 2006/0113979 A1 | 6/2006 | Ishigaki et al. |
| 2006/0118162 A1 | 6/2006 | Saelzer et al. |
| 2006/0132102 A1 | 6/2006 | Harvey |
| 2006/0149396 A1 | 7/2006 | Templeton |
| 2006/0162772 A1 | 7/2006 | Presher, Jr. et al. |
| 2006/0163946 A1 | 7/2006 | Henne et al. |
| 2006/0171182 A1 | 8/2006 | Siri et al. |
| 2006/0174939 A1 | 8/2006 | Matan |
| 2006/0185727 A1 | 8/2006 | Matan |
| 2006/0192540 A1 | 8/2006 | Balakrishnan et al. |
| 2006/0208660 A1 | 9/2006 | Shinmura et al. |
| 2006/0227578 A1 | 10/2006 | Datta et al. |
| 2006/0237058 A1 | 10/2006 | McClintock et al. |
| 2007/0044837 A1 | 3/2007 | Simburger et al. |
| 2007/0075711 A1 | 4/2007 | Blanc et al. |
| 2007/0081364 A1 | 4/2007 | Andreycak |
| 2007/0147075 A1 | 6/2007 | Bang |
| 2007/0159866 A1 | 7/2007 | Siri |
| 2007/0164750 A1 | 7/2007 | Chen et al. |
| 2007/0165347 A1 | 7/2007 | Wendt et al. |
| 2007/0205778 A1 | 9/2007 | Fabbro et al. |
| 2007/0227574 A1 | 10/2007 | Cart |
| 2007/0236187 A1 | 10/2007 | Wai et al. |
| 2007/0273342 A1 | 11/2007 | Kataoka et al. |
| 2008/0024098 A1 | 1/2008 | Hojo |
| 2008/0080177 A1 | 4/2008 | Chang |
| 2008/0088184 A1 | 4/2008 | Tung et al. |
| 2008/0097655 A1 | 4/2008 | Hadar et al. |
| 2008/0106250 A1 | 5/2008 | Prior et al. |
| 2008/0115823 A1 | 5/2008 | Kinsey |
| 2008/0136367 A1 | 6/2008 | Adest et al. |
| 2008/0143188 A1 | 6/2008 | Adest et al. |
| 2008/0143462 A1 | 6/2008 | Belisle et al. |
| 2008/0144294 A1 | 6/2008 | Adest et al. |
| 2008/0147335 A1 | 6/2008 | Adest et al. |
| 2008/0150366 A1 | 6/2008 | Adest et al. |
| 2008/0164766 A1 | 7/2008 | Adest et al. |
| 2008/0179949 A1 | 7/2008 | Besser et al. |
| 2008/0236647 A1 | 10/2008 | Gibson et al. |
| 2008/0236648 A1 | 10/2008 | Klein et al. |
| 2008/0238195 A1 | 10/2008 | Shaver et al. |
| 2008/0246460 A1 | 10/2008 | Smith |
| 2008/0246463 A1 | 10/2008 | Sinton et al. |
| 2009/0066399 A1 | 3/2009 | Chen et al. |
| 2009/0073726 A1 | 3/2009 | Babcock |
| 2009/0084570 A1 | 4/2009 | Gherardini et al. |
| 2009/0097172 A1 | 4/2009 | Bremicker et al. |
| 2009/0102440 A1 * | 4/2009 | Coles ............... 323/271 |
| 2009/0140715 A1 | 6/2009 | Adest et al. |
| 2009/0141522 A1 | 6/2009 | Adest et al. |
| 2009/0145480 A1 | 6/2009 | Adest et al. |
| 2009/0146667 A1 | 6/2009 | Adest et al. |
| 2009/0146671 A1 | 6/2009 | Gazit |
| 2009/0147554 A1 | 6/2009 | Adest et al. |
| 2009/0190275 A1 | 7/2009 | Gilmore et al. |
| 2009/0206666 A1 | 8/2009 | Sella et al. |
| 2009/0224817 A1 | 9/2009 | Nakamura et al. |
| 2009/0237042 A1 | 9/2009 | Glovinski |
| 2009/0237043 A1 | 9/2009 | Glovinsky |
| 2009/0273241 A1 | 11/2009 | Gazit et al. |
| 2009/0282755 A1 | 11/2009 | Abbott et al. |
| 2009/0322494 A1 | 12/2009 | Lee |
| 2010/0052735 A1 | 3/2010 | Burkland et al. |
| 2010/0085670 A1 | 4/2010 | Palaniswami et al. |
| 2010/0124027 A1 | 5/2010 | Handelsman et al. |
| 2010/0139743 A1 | 6/2010 | Hadar et al. |
| 2010/0214808 A1 | 8/2010 | Rodriguez |
| 2010/0244575 A1 | 9/2010 | Coccia et al. |
| 2010/0269430 A1 | 10/2010 | Haddock |
| 2010/0282290 A1 | 11/2010 | Schwarze et al. |
| 2010/0301991 A1 | 12/2010 | Sella et al. |
| 2010/0308662 A1 | 12/2010 | Schatz et al. |
| 2011/0006743 A1 * | 1/2011 | Fabbro ............... 323/282 |
| 2011/0043172 A1 * | 2/2011 | Dearn ............... 323/259 |
| 2011/0084553 A1 | 4/2011 | Adest et al. |
| 2011/0114154 A1 | 5/2011 | Lichy et al. |
| 2011/0121652 A1 | 5/2011 | Sella et al. |
| 2011/0125431 A1 | 5/2011 | Adest et al. |
| 2011/0133552 A1 | 6/2011 | Binder et al. |
| 2011/0140536 A1 | 6/2011 | Adest et al. |
| 2011/0181251 A1 | 7/2011 | Porter et al. |
| 2011/0210611 A1 | 9/2011 | Ledenev et al. |
| 2011/0254372 A1 | 10/2011 | Haines et al. |
| 2011/0267859 A1 | 11/2011 | Chapman |
| 2011/0271611 A1 | 11/2011 | Maracci et al. |
| 2011/0273015 A1 | 11/2011 | Adest et al. |
| 2011/0273016 A1 | 11/2011 | Adest et al. |
| 2011/0285205 A1 | 11/2011 | Ledenev et al. |
| 2011/0290317 A1 | 12/2011 | Naumovitz et al. |
| 2011/0291486 A1 | 12/2011 | Adest et al. |

| | | | |
|---|---|---|---|
| 2011/0316346 A1 | 12/2011 | Porter et al. | |
| 2012/0007613 A1 | 1/2012 | Gazit | |
| 2012/0032515 A1 | 2/2012 | Ledenev et al. | |
| 2012/0091810 A1 | 4/2012 | Aiello et al. | |

FOREIGN PATENT DOCUMENTS

| | | |
|---|---|---|
| DE | 19737286 | 3/1999 |
| DE | 102005030907 | 1/2007 |
| DE | 102008057874 | 5/2010 |
| EP | 0419093 | 3/1991 |
| EP | 0420295 A1 | 4/1991 |
| EP | 0604777 A1 | 7/1994 |
| EP | 0756178 | 1/1997 |
| EP | 0827254 | 3/1998 |
| EP | 1330009 | 7/2003 |
| EP | 1503490 | 2/2005 |
| EP | 1531545 A2 | 5/2005 |
| EP | 1657557 | 5/2006 |
| EP | 1657797 A1 | 5/2006 |
| EP | 1887675 | 2/2008 |
| EP | 2048679 | 4/2010 |
| ES | 2249147 | 3/2006 |
| ES | 2249149 | 3/2006 |
| GB | 2480015 A | 11/2011 |
| GB | 2480015 B | 12/2011 |
| JP | 61065320 | 4/1986 |
| JP | 6165320 | 5/1986 |
| JP | 11041832 | 2/1999 |
| JP | 11103538 | 4/1999 |
| JP | 2003124492 | 4/2003 |
| JP | 2003-134667 A | 5/2003 |
| JP | 2007-058845 A | 3/2007 |
| WO | WO 93/13587 A1 | 7/1993 |
| WO | WO 96/13093 A1 | 5/1996 |
| WO | 9823021 | 5/1998 |
| WO | WO 98/23021 A2 | 5/1998 |
| WO | 0000839 | 1/2000 |
| WO | 0021178 | 4/2000 |
| WO | 0075947 | 12/2000 |
| WO | 0231517 | 4/2002 |
| WO | WO 03/050938 A2 | 6/2003 |
| WO | WO 03/071655 A1 | 8/2003 |
| WO | WO 2004/023278 A2 | 3/2004 |
| WO | WO 2004/090993 A2 | 10/2004 |
| WO | 2004107543 | 12/2004 |
| WO | 2005076444 | 8/2005 |
| WO | WO 2005/076445 A1 | 8/2005 |
| WO | 2006005125 | 1/2006 |
| WO | 2006007198 | 1/2006 |
| WO | WO 2006/078685 A2 | 7/2006 |
| WO | WO 2007/006564 A2 | 1/2007 |
| WO | 2007048421 | 5/2007 |
| WO | 2007073951 | 7/2007 |
| WO | WO 2007/084196 A2 | 7/2007 |
| WO | 2007090476 | 8/2007 |
| WO | WO 2007/113358 A1 | 10/2007 |
| WO | 2008132551 | 11/2008 |
| WO | 2008132553 | 11/2008 |
| WO | 2009051853 | 4/2009 |
| WO | 2009118682 | 10/2009 |
| WO | 2009118683 | 10/2009 |
| WO | 2009136358 | 11/2009 |
| WO | 2010065043 | 6/2010 |
| WO | 2010065388 | 6/2010 |
| WO | 2010072717 | 7/2010 |
| WO | 2010134057 | 11/2010 |
| WO | 2011011711 | 1/2011 |
| WO | 2011017721 | 2/2011 |

OTHER PUBLICATIONS

International Search Report for PCT/IB2007/004584 dated Jan. 28, 2009.
International Search Report for PCT/IB2007/004586 dated Mar. 5, 2009.
International Search Report for PCT/IB2007/004643 dated Jan. 30, 2009.
International Search Report for PCT/US2008/085736 dated Jan. 28, 2009.
International Search Report for PCT/US2008/085754 dated Feb. 9, 2009.
International Search Report for PCT/US2008/085755 dated Feb. 3, 2009.
Atsushi Kajihara, et al. "Model of Photovoltaic Cell Circuits Under Partial Shading," 2005 IEEE, pp. 866-870.
G. R. Walker, et al., "Cascaded DC-DC Converter Connection of Photovoltaic Modules," $33^{rd}$ Annual IEEE Power Electronics Specialists Conference, Cairns, Queensland, Australia, Jun. 23-27, 2002, pp. 24-29, vol. 1, New York, NY.
Werner Knaupp, et al., "Operation of a 10 KW PV Façade with 100 W AC Photovoltaic Modules," 1996 IEEE, $25^{th}$ PVSC, May 13-17, 1996, pp. 1235-1238, Washington, D.C.
O. Alonso, et al., "Cascaded H-Bridge Multilevel Converter for Grid Connected Photovoltaic Generators with Independent Maximum Power Point Tracking of Each Solar Array," 2003 IEEE $34^{th}$, Annual Power Electronics Specialists Conference, Acapulco, Mexico, Jun. 15-19, 2003, pp. 731-735, vol. 2.
R. Orduz, et al., "Evaluation Test Results of a New Distributed MPPT Converter," 22nd European Photovoltaic Solar Energy Conference, Sep. 3-7, 2007, Milan, Italy.
J.M.A. Myrzik, et al., "String and Module Integrated Inverters for Single-Phase Grid Connected Photovoltaic Systems—A Review," Power Tech Conference Proceedings, 2003 IEEE Bologna, Jun. 23-26, 2003 p. 8, vol. 2.
Volker Quaschning, et al., "Cost Effectiveness of Shadow Tolerant Photovoltaic Systems," EuroSun '96, Freiburg, Germany, Sep. 16-19, 1996, pp. 819-824.
E. Roman, et al., "Power Line Communications in Modular PV Systems," $20^{th}$ European Photovoltaic Solar Energy Conference, Jun. 6-10, 2005, Barcelona, Spain, pp. 2249-2252.
S. Uriarte, et al., "Energy Integrated Management System for PV Applications," 20th European Photovoltaic Solar Energy Conference, Jun. 6-10, 2005, Barcelona, Spain, pp. 2292-2295.
Jingquan Chen, et al., "Predictive Digital Current Programmed Control". IEEE Transaction on Power Electronics, Jan. 2003, vol. 18, No. 1.
K. Wallace, et al., "DSP Controlled Buck/Boost Power Factor Correction for Telephony Rectifiers". INTELEC 2001, Oct. 14-18, 2001, Peco-II, Inc., USA.
Written Opinion for PCT/IB2008/055092 submitted with IPRP dated Jun. 8, 2010.
IPRP for PCT/US2008/085754 dated Jun. 8, 2010, with Written Opinion dated Jan. 21, 2009.
IPRP for PCT/US2008/085755 dated Jun. 8, 2010, with Written Opinion dated Jan. 20, 2009.
IPRP for PCT/IB2009/051221 dated Sep. 28, 2010, with Written Opinion.
IPRP for PCT/IB2009/051222 dated Sep. 28, 2010, with Written Opinion.
IPRP for PCT/IB2009/051831 dated Nov. 9, 2010, with Written Opinion.
IPRP for PCT/US2008/085736 dated Jun. 7, 2011, with Written Opinion.
IPRP for PCT/IB2010/052287 dated Nov. 22, 2011, with Written Opinion.
ISR for PCT/IB2010/052413 dated Sep. 7, 2010.
UK Intellectual Property Office, Application No. GB1109618.7, Patents Act 1977, Examination Report Under Section 18(3), Sep. 16, 2011.
UK Intellectual Property Office, Patents Act 1977: Patents Rules Notification of Grant: Patent Serial No. GB2480015, Nov. 29, 2011.
Ciobotaru, et al., Control of single-stage single-phase PV inverter, Aug. 7, 2006.
International Search Report and Written Opinion for PCT/IB2007/004591 dated Jul. 5, 2010.
European Communication for EP07873361.5 dated Jul. 12, 2010.
European Communication for EP07874022.2 dated Oct. 18, 2010.
European Communication for EP07875148.4 dated Oct. 18, 2010.
Chen, et al., "A New Low-Stress Buck-Boost Converter for Universal-Input PFC Applications", IEEE Applied Power Electronics Converence, Feb. 2001, Colorado Power Electronics Center Publications.

Chen, et al., "Buck-Boost PWM Converters Having Two Independently Controlled Switches", IEEE Power Electronics Specialists Converence, Jun. 2001, Colorado Power Electronics Center Publications.

Esram, et al., "Comparison of Photovoltaic Array Maximum Power Point Tracking Techniques", IEEE Transactions on Energy Conversion, vol. 22, No. 2, Jun. 2007, pp. 439-449.

Walker, et al., "PhotoVoltaic DC-DC Module Integrated Converter for Novel Cascaded and Bypass Grid Connection Topologies-Design and Optimisation", 37th IEEE Power Electronics Specialists Converence, Jun. 18-22, 2006, Jeju, Korea.

Geoffrey R. Walker Affidavit re: U.S. Appl. No. 11/950,307.

Geoffrey R. Walker Affidavit re: U.S. Appl. No. 11/950,271.

Alonso, "A New Distributed Converter Interface for PV Panels", 20th European Photovoltaic Solar Energy Conference, Jun. 6-10, 2005, Barcelona, Spain, pp. 2288-2291.

Alonso, "Experimental Results of Intelligent PV Module for Grid-Connected PV Systems", 21st European Photovoltaic Solar Energy Conference, Sep. 4-8, 2006, Dresden, Germany, pp. 2297-2300.

Enslin, Integrated Photovoltaic Maximum Power Point Tracking Converter, IEEE Transactions on Industrial Electronics, vol. 44, No. 6, Dec. 1997, pp. 769-773.

Lindgren, "Topology for Decentralised Solar Energy Inverters with a Low Voltage AC-Bus", Chalmers University of Technology, Department of Electrical Power Engineering, EPE '99—Lausanne.

Nikraz, "Digital Control of a Voltage Source Inverter in a Photovoltaic Applications", 2004 35th Annual IEEE Power Electronics Specialists Conference, Aachen, Germany, 2004, pp. 3266-3271.

Palma, "A Modular Fuel Cell, Modular DC-DC Converter Concept for High Performance and Enhanced Reliability", IEEE 2007, pp. 2633-2638.

Roman, "Intelligent PV Module for Grid-Connected PV Systems", IEEE Transactions on Industrial Electronics, vol. 52, No. 4, Aug. 2006, pp. 1066-1073.

Walker, "Cascaded DC-DC Converter Connection of Photovoltaic Modules", IEEE Transactions on Power Electronics, vol. 19, No. 4, Jul. 2004, pp. 1130-1139.

Matsui, et al. "A New Maximum Photovoltaic Power Tracking Control Scheme Based on Power Equilibrium at DC Link", IEEE, 1999, pp. 804-809.

International Preliminary Report on Patentability for PCT/IB2008/055092 dated Jun. 8, 2010.

International Search Report for PCT/IB2008/055092 dated Sep. 8, 2009.

International Search Report and Opinion of International Patent Application WO2009136358 (PCT/IB2009/051831), dated Sep. 16, 2009.

PCT/IB2010/052287 International Search Report and Written Opinion dated Sep. 2, 2010.

UK Intellectual Property office, Combined Search and Examination Report for GB1100450.4 under Sections 17 and 18 (3), Jul. 14, 2011.

Jain, et al., "A Single-Stage Grid Connected Inverter Topology for Solar PV Systems with Maximum Power Point Tracking", IEEE Transactions on Power Electronics, vol. 22, No. 5, Sep. 2007, pp. 1928-1940.

Lynch, et al., "Flexible DER Utility Interface System: Final Report", Sep. 2004-May 2006, Northern Power Systems, Inc., Waitsfield, Vermont B. Kroposki, et al., National Renewable Energy Laboratory Golden, Colorado Technical Report NREL/TP-560-39876, Aug. 2006.

Schimpf, et al., "Grid Connected Converters for Photovoltaic, State of the Art, Ideas for improvement of Transformerless Inverters", NORPIE/2008, Nordic Workshop on Power and Industrial Electronics, Jun. 9-11, 2008.

Sandia Report SAND96-2797 IUC-1290 Unlimited Release, Printed Dec. 1996, "Photovoltaic Power Systems and The National Electrical Code: Suggested Practices", by John Wiles, Southwest Technology Development Instutte New Mexico State University Las Cruces, NM.

United Kingdom Intellectual Property Office, Combined Search and Examination Report Under Sections 17 and 18(3), GB1020862.7, dated Jun. 16, 2011.

QT Technical Application Papers, "ABB Circuit-Breakers for Direct current Applications", ABB SACE S.p.A., An ABB Group Coupany, L.V. Breakers, Via Baioni, 35, 24123 Bergamo-Italy, Tel.: +39 035.395.111—Telefax: +39 035.395.306-433.

Woyte, et al., "Mains Monitoring and Protection in a European Context", 17th European Photovoltaic Solar Energy Conference and Exhibition, Munich, Germany, Oct. 22-26, 2001, ACHIM, WOYTE, et al., pp. 1-4.

"Implementation and testing of Anti-Islanding Algorithms for IEEE 929-2000 Compliance of Single Phase Photovoltaic Inverters", Raymond M. Hudson, Photovoltaic Specialists Conference, 2002. Conference Record of the Twenty-Ninth IEEE, May 19-24, 2002.

Fairchild Semiconductor, Application Note 9016, IGBT Basics 1, by K.S. OH Feb. 1, 2001.

"Disconnect Switches in Photovoltaic Applications", ABB, Inc., Low Voltage Control Products & Systems, 1206 Hatton Road, Wichita Falls, TX 86302, Phone 888-385-1221, 940-397-7000, Fax: 940-397-7085, 1SXU301197B0201, Nov. 2009.

Walker, "A DC Circuit Breaker for an Electric Vehicle Battery Pack", Australasian Universities Power Engineering Conference and IEAust Electric Energy Conference, Sep. 26-29, 1999.

Combined Search and Examination Report for GB1018872.0 dated Apr. 15, 2011, 2 pages.

International Search Report and Opinion of International Patent Application PCT/2009/051221, dated Oct. 19, 2009.

International Search Report and Opinion of International Patent Application PCT/2009/051222, dated Oct. 7, 2009.

Communication in EP07874025.5 dated Aug. 17, 2011.

IPRP for PCT/IB2008/055095 dated Jun. 8, 2010, with Written Opinion.

ISR for PCT/IB2008/055095 dated Apr. 30, 2009.

IPRP for PCT/IL2007/001064 dated Mar. 17, 2009, with Written Opinion dated Mar. 25, 2008.

ISR for PCT/IL07/01064 dated Mar. 25, 2008.

IPRP for PCT/IB2007/004584 dated Jun. 10, 2009, with Written Opinion.

IPRP for PCT/IB2007/004586 dated Jun. 10, 2009, with Written Opinion.

IPRP for PCT/IB2007/004591 dated Jul. 13, 2010, with Written Opinion.

IPRP for PCT/IB2007/004610 dated Jun. 10, 2009, with Written Opinion.

IPRP for PCT/IB2007/004643 dated Jun. 10, 2009, with Written Opinion.

Hou, et al., Application of Adaptive Algorithm of Solar Cell Battery Charger, Apr. 2004.

Stamenic, et al., "Maximum Power Point Tracking for Building Integrated Photovoltaic Ventilation Systems", 2000.

Informal Comments to the International Search Report dated Dec. 3, 2009.

Walker, et al. "PV String Per-Module Maximum Power Point Enabling Converters", School of Information Technology and Electrical Engineering The University of Queensland, Sep. 28, 2003.

Walker, "Cascaded DC-DC Converter Connection of Photovoltaic Modules", 33rd Annual IEEE Power Electronics Specialists Conference. PESC 2002. Conference Proceedings. CAIRNS, Queensland, Australia, Jun. 23-27, 2002; [Annual Power Electronics Specialists Conference], New York, NY: IEEE US, vol. 1, Jun. 23, 2002, pp. 24-29, XP010596060 ISBN: 978-0-7803-7262-7, figure 1.

Baggio, "Quasi-ZVS Activity Auxiliary Commutation Circuit for Two Switches Forward Converter", 32nd Annual IEEE Power Electronics Specialists Conference. PESC 2001. Conference Proceedings. Vancouver, Canada, Jun. 17-21, 2001; [Annual Power Electronics Specialists Conference] New York, NY: IEEE, US.

Ilic, "Interleaved Zero-Current-Transition Buck Converter", IEEE Transactions on Industry Applications, IEEE Service Center, Piscataway, NJ, US, vol. 43, No. 6, Nov. 1, 2007, pp. 1619-1627, XP011197477 ISSN: 0093-9994, pp. 1619-1922.

Lee: "Novel Zero-Voltage-Transition and Zero-Current-Transition Pulse-Width-Modulation Converters", Power Electronics Specialists Conference, 1997, PESC '97, Record, 28th Annual IEEE St. Louis, MO, USA, Jun. 22-27, 1997, New York, NY, USA IEEE, US, vol. 1, Jun. 22, 1997, pp. 233-239, XP010241553, ISBN: 978-0-7803-3840-1, pp. 233-236.

Sakamoto, "Switched Snubber for High-Frequency Switching Converters", Electronics & Communications in Japan, Part 1—Communications, Wiley, Hoboken, NJ, US, vol. 76, No. 2, Feb. 1, 1993, pp. 30-38, XP000403018 ISSN: 8756-6621, pp. 30-35.

Duarte, "A Family of ZVX-PWM Active-Clamping DC-to-DC Converters: Synthesis, Analysis and Experimentation", Telecommunications Energy Conference, 1995, INTELEC '95, 17th International The Hague, Netherlands, Oct. 29-Nov. 1, 1995, New York, NY, US, IEEE, US, Oct. 29, 1995, pp. 502-509, XP010161283 ISBN: 978-0-7803-2750-4 p. 503-504.

Gao, et al., "Parallel-Connected Solar PV System to Address Partial and Rapidly Fluctuating Shadow Conditions", IEEE Transactions on Industrial Electronics, vol. 56, No. 5, May 2009, pp. 1548-1556.

* cited by examiner

DIGITAL AVERAGE INPUT CURRENT CONTROL IN POWER CONVERTER

RELATED APPLICATIONS

This Application claims priority from U.S. Provisional Application No. 60/954,261 filed on Aug. 6, 2007 and U.S. Provisional Application No. 60/954,354 filed on Aug. 7, 2007.

BACKGROUND

The subject invention relates to control loops for switching converters. The following articles and patents, which may or may not be prior art, and which are incorporated here by reference, may be relevant to the subject invention.

- Jingquan Chen, Aleksandar Prodic, Robert W. Erickson and Dragan Maksimovic, "*Predictive Digital Current Programmed Control*". IEEE Transaction on Power Electronics, Vol. 18, No. 1, January 2003
- U.S. Pat. No. 7,148,669, "Predictive Digital Current Controllers for Switching Power Converters" by Dragan Maksimovic, Jingquan Chen, Aleksandar Prodic, and Robert W. Erickson.
- K Wallace, G Mantov, "*DSP Controlled Buck/Boost Power Factor Correction for Telephony Rectifiers*". INTELEC 2001, 14-18 October 2001.
- U.S. Pat. No. 6,166,527, "Control Circuit and Method for Maintaining High Efficiency in a Buck-Boost Switching Regulator" by David M. Dwelley, and Trevor W. Barcelo.

Additionally, the following basic text is incorporated here by reference, in order to provide the reader with relevant art and definitions:

- Robert W. Erickson, Dragan Maksimovic, "Fundamentals of Power Electronics" (Second Edition), ISBN 0792372700.

SUMMARY

Aspects of the invention provide a method and system for digitally controlling the average input current in a non-inverting buck-boost converter. The method provides a fast cycle-by-cycle control loop to set the average input current when the converter is working in three different modes: buck, buck-boost and boost. Unlike analog control where it is difficult to change the parameters of the control loop in an adaptive manner, a digital control system can adjust the control loop parameters according to various parameters measured such as input voltage, output voltage and inductor current. In general, this enables to achieve a fast and stable control loop that controls the input current in various working points of the converter.

Aspects of the invention also provide for a method and system for digitally controlling the input current in a non-inverting (cascaded) buck-boost converter operating in a buck-boost mode, i.e., alternating between buck and boost in each cycle. Such an operation mode is particularly beneficial when the required converter output current is similar to the converter's input current. Since there are limits to the maximal and minimal allowed PWM values of the buck or boost operational modes, there are areas in which control is impossible without use of the alternating buck-boost mode.

Aspects of the invention further provide for a method and system for controlling the operational mode switching of a cascaded buck-boost converter. According to aspects of the invention, whenever the converter has been operated in one mode, i.e., buck or boost, for at least a predetermined period, and is needed to change into the other operational mode, i.e., to boost or buck, the transition is performed by forcing the converter to first execute several cycles on alternating buck and boost modes and only then switching to the other mode. Thus, for example, if the converter has been operating in a buck mode and is now to be switched to a boost mode, it is first switched to operate in an alternating buck-boost mode, in which the converter alternates by each cycle between buck and boost modes for several cycles, and only then switches to boost mode. This feature avoids the current jumps or discontinuities that are generally observed when a converter switches between buck and boost modes of operation.

Aspects of the invention further provide for a method and system for controlling the operation of a cascaded buck-boost converter, operable in one of three modes: buck, boost, and alternating buck-boost. The system includes three preprogrammed PWM control modules, each for controlling the input current according to one of the converter's operational modes. During operation of the converter, the operational mode is determined and the corresponding PWM control module is selected to control the input current.

DETAILED DESCRIPTION

Figure 1:
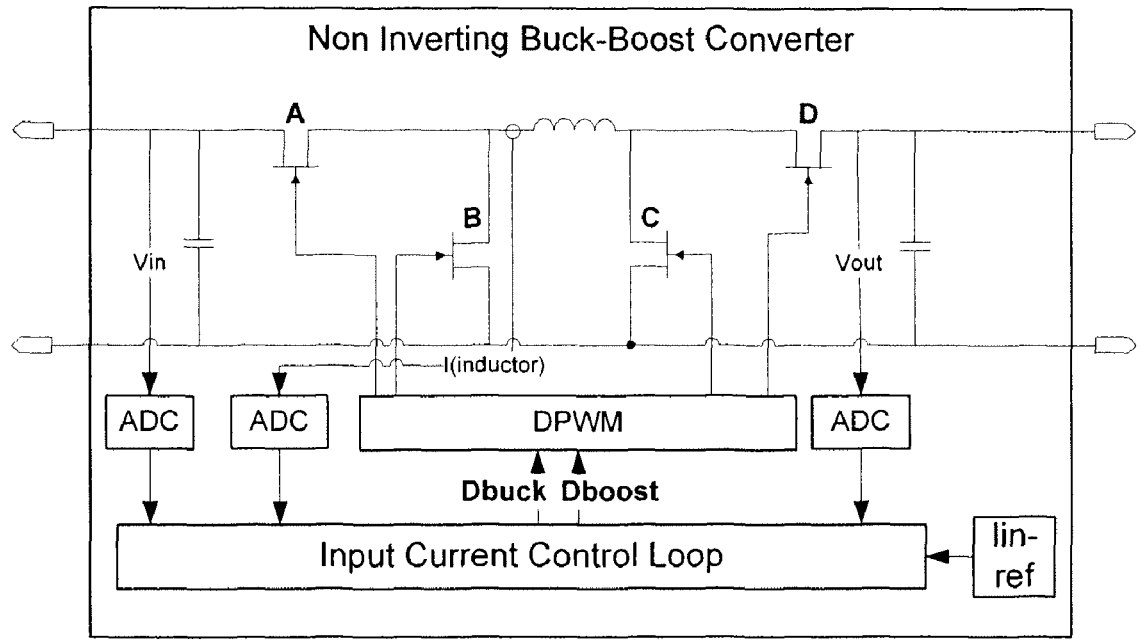
FIG. 1 illustrate an example of a digital controlled non-inverting buck-boost converter according to aspects of the invention.

A digital controlled non-inverting (cascaded) buck-boost converter, as described in FIG. 1, is a topology for a converter that is capable of both increasing the input voltage and decreasing it. The proposed topology is beneficial over prior art converters for at least the following reasons: 1) high conversion efficiency can be achieved; 2) component stress is relatively low as apposed to other buck-boost topologies; and 3) low component count—only one inductor, two capacitors and four switches. When buck-boost converters are discussed in this specification, we typically refer to cascaded buck-boost topology, sometimes named "non-inverting buck-boost" converter, rather then the lower efficiency (inverting) buck-boost converter.

While in general control loops of converters the inductor current is controlled, according to an embodiment of the invention, a control loop is provided in order to set the average input current to the requested current ($I_{ref}$) Controlling the average input current can be relevant for various applications such as: power factor correction (PFC), photovoltaic inverters, and more. In this example, the control is based on predicting the inductor current for the next switching cycle based on measuring the input voltage ($V_{In}$), the output voltage ($V_{Out}$) and the inductor current ($I_L$) in the current switching cycle. By using a predictive method a fast, cycle-by-cycle, control loop can be implemented.

Converter Modes

The cascaded buck-boost topology can achieve the desired input average current at various output currents. Depending on the output current, the converter can work in 3 different modes:
1. $I_{ref} > I_{out}$: Boost Converter—Switch A is constantly conducting and switch B is not conducting.
2. $I_{ref} < I_{out}$: Buck Converter—Switch D is constantly conducting and switch C is not conducting.
3. $I_{ref} \approx I_{out}$: Buck-Boost Converter—All four switches are being used to control the input current.

Each of the three modes may have a different control schemes. The control loop will decide which control scheme is used at each switching cycle.

Predictive Average Input Current Control Using Triangle PWM Modulation

The control scheme of this example is based on predicting the inductor current for the next switching cycle based on measuring the inductor current and the input and output voltage. Based on the inductor current the control loop sets the average input current. Because of the fact that the predictive control loop is a non-linear control loop and it is executed on every PWM cycle, a high control bandwidth can be achieved.

The following sections will explain the concept of triangle PWM modulation and the three control schemes mentioned above.

Triangle PWM Modulation

Figure 2:
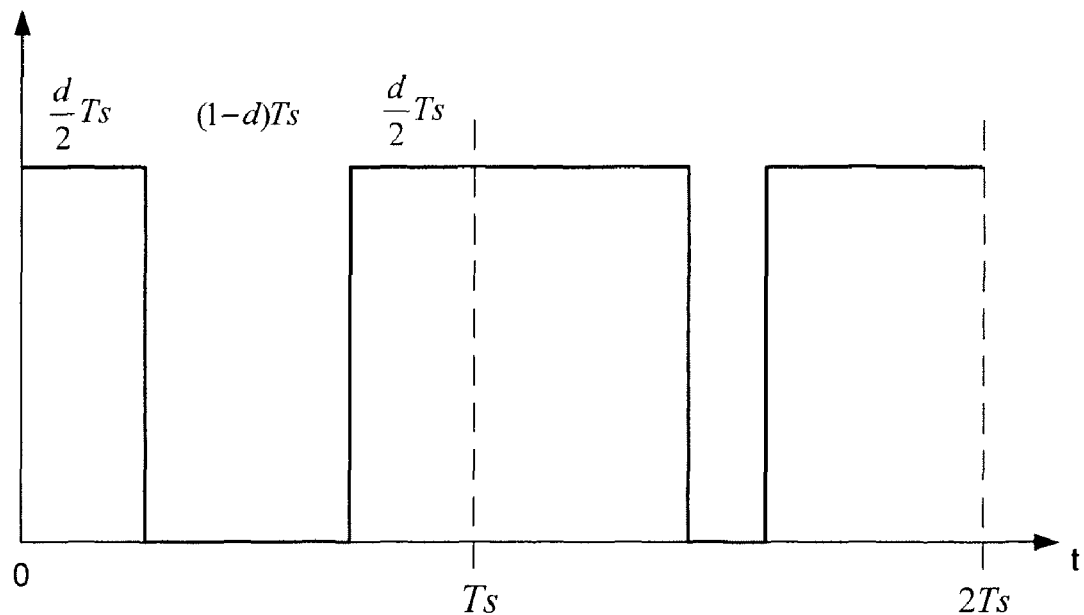
FIG. 2 illustrates the waveforms of trailing triangle PWM modulation.

There are two types of triangle PWM modulation—leading and trialing triangle modulation. FIG. 2 illustrates the waveforms of trailing triangle PWM modulation.

Figure 3:
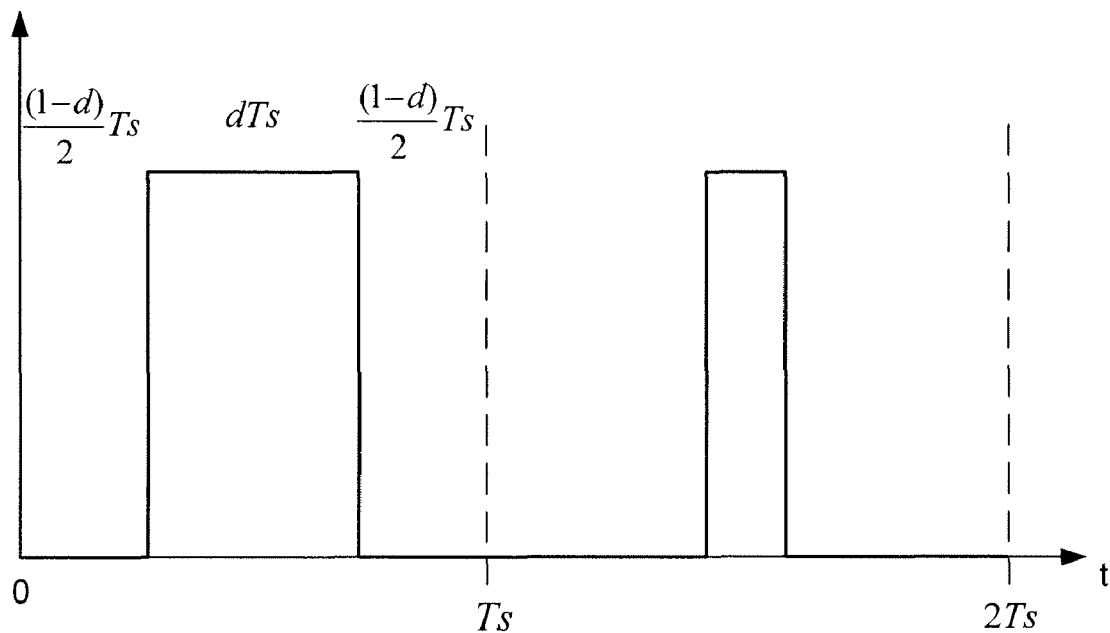
FIG. 3 illustrates the waveforms of leading triangle PWM modulation.

Each cycle, having length $T_s$ and a duty cycle of d, starts with an on-time of length $$\frac{d}{2} T_s$$

an off-time of $(1-d)T_s$ and another on-time of the same length. Leading triangle modulation is similar but the on-time and off-times are switched, as shown in FIG. 3. Both methods are suitable for input average current control because of the fact that the average inductor current is always at the beginning of each PWM cycle. This enables the digital control loop to sample the average inductor current at fixed intervals, at the beginning of each cycle.

Controlling Average Input Current Using the Inductor Current

The method of this example uses the inductor current to set the average input current when the converting is operating in continuous conduction mode (CCM). The converter can work in one of three different modes—Buck, Boost, Buck-Boost. For each mode there is a different equation for converting the average inductor current to the average input current in each switching cycle. Derived from the power train properties of the converter, the equations are:
1. Boost: $\tilde{I}_{In} = \tilde{I}_L$
2. Buck: $\tilde{I}_{In} = \tilde{I}_L * d$, where d is the duty cycle.
3. Buck-Boost: $\tilde{I}_{In} = \tilde{I}_L * d_{buck}$ where $d_{buck}$ is the buck duty cycle For all of the equations above $\tilde{I}_{In}$, $\tilde{I}_L$ denote the average input current and average inductor current, respectively.

Control Loops

The converter works in 3 different modes. For each mode a different control loop is used to control the average input current. This section will describe each control loop for the different modes. Later on, the algorithm for switching between the modes will be described.

Predictive Boost Input Current Control

Figure 4:
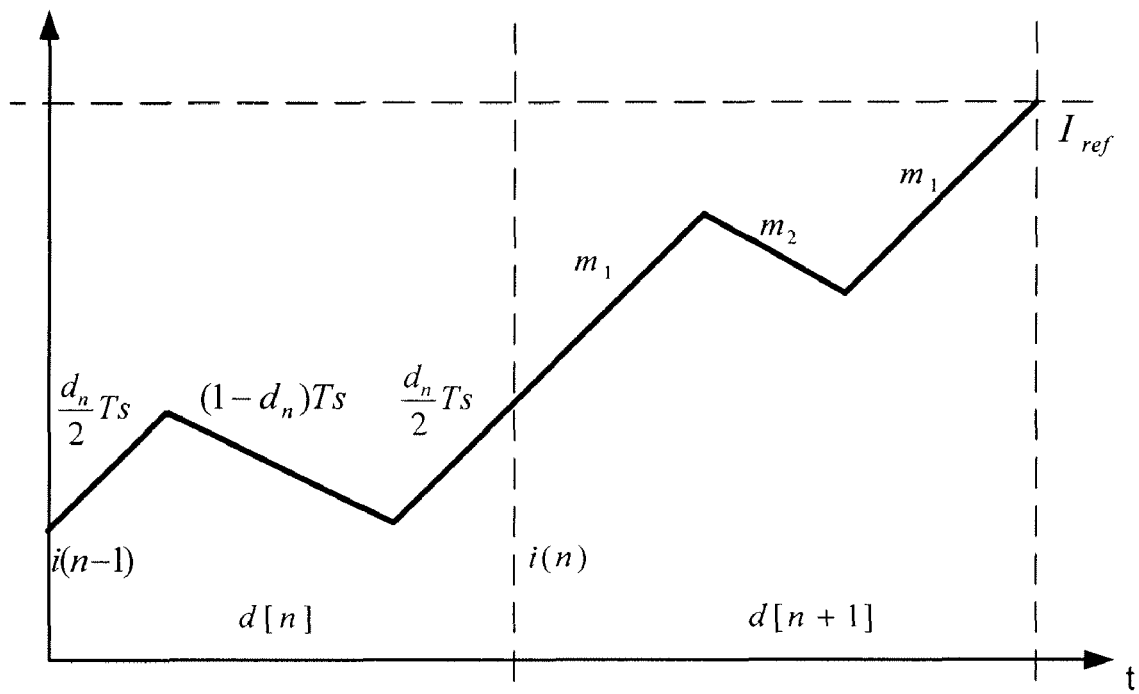
FIG. 4 shows the inductor current waveform during two switching cycles using trailing edge triangle PWM modulation.

The goal of the control loop is to insure that the average input current follows the reference $I_{ref}$. As described above, when the converter operates in a boost mode the steady state average input current is the same as the average inductor current. In this mode the boost control will try to set the average inductor current to $I_{ref}$. The required boost duty cycle for the next switching cycle is predicted based on the sampled inductor current, the input voltage and the output voltage. FIG. 4 shows the inductor current waveform during two switching cycles using trailing edge triangle PWM modulation. The sampled inductor current at switching cycle n, i(n), can be calculated using the previous sample, i(n−1), and the input and output voltage. The calculation is based on the inductor current slopes during the on-time and off-time.

Since the input and output voltage change slowly we assume that they are constant during a switching cycle. For a boost converter the on-time slope ($m_1$) and off-time slope ($m_2$) are given by the following equations:

$$m_1 = \frac{V_{in}}{L} \quad (1)$$

$$m_2 = \frac{V_{in} - V_{out}}{L} \quad (2)$$

Based on these equations we can predict i(n) using the following equation:

$$i_{pred}(n) = i(n) = i(n-1) + \frac{V_{in} d[n] T_s}{L} + \frac{(V_{in} - V_{out}) d'[n] T_s}{L} \quad (3)$$

Where $d'[n] = 1 - d[n]$, $T_s$ is the switching cycle time and L is the inductor inductance. Equation (3) can also be written as:

$$i_{pred}(n) = i(n) = i(n-1) + \frac{V_{out} d[n] T_s}{L} + \frac{(V_{in} - V_{out}) T_s}{L} \quad (4)$$

We now have the prediction equation for one switching cycle. Because of the fact that every digital implementation of the control loop will have an execution delay, we will extend the prediction to one more switching cycle. So the prediction will set the duty cycle of the n+1 switching cycle based on the samples of the n−1 switching cycle. Extending equation (4) to two switching cycles we get:

$$i(n+1) = i_{pred}(n) + \frac{V_{out} d[n+1] T_s}{L} + \frac{(V_{in} - V_{out}) T_s}{L} \quad (5)$$

The prediction for the duty cycle d[n+1] can now be obtained based on the values sampled in the previous switching period. By substituting i(n+1) with the desired current $I_{ref}$, in equation (5), and by solving the equation for d[n+1] we get:

$$d[n+1] = (I_{ref} - i_{pred}(n))\frac{L}{T_s * V_{out}} + 1 - \frac{V_{in}}{V_{out}} \quad (6)$$

Because of the fact that the inductor inductance can vary and to be able to achieve a slower control loop, we modify equation (6) with a variable gain that can be pre-adjusted, and we get:

$$d[n+1] = (I_{ref} - i_{pred}(n))\frac{L*K}{T_s * V_{out}} + 1 - \frac{V_{in}}{V_{out}} \quad (7)$$

Equation (7) is the control law when the converter is in boost mode.

If we denote $T_i$ as the beginning time of each switching cycle (i), the above method samples the input voltage, output voltage, and inductor current at time $T_0$, utilizes the time until $T_1$ to predict the inductor current at $T_1$ using the input voltage, output voltage and the knowledge of the inductor inductance, and calculate the needed duty-cycle in order to reach the desired input current ($I_{ref}$) at $T_2$, and set that duty cycle to be performed in the switching cycle between $T_1$ and $T_2$.

Predictive Buck Input Current Control

The principles of the predictive buck average input current control loop are similar to those of the boost current control loop. For the buck converter, the on-time and off-time inductor slopes are given by the following equations:

$$m_1 = \frac{V_{in} - V_{out}}{L} \quad (8)$$

$$m_2 = -\frac{V_{out}}{L} \quad (9)$$

For switching cycle number n the average input current, based on the inductor current, is:

$$\tilde{i}(n) = \left(i(n-1) + \frac{m_1 d[n]T_s}{L} + \frac{m_2 d'[n]T_s}{L}\right) * d[n] \quad (10)$$

Based on equations (8) and (9) we can predict the inductor current for one switching cycle, and get the following equation:

$$i(n) = i(n-1) + \frac{(V_{in} - V_{out})d[n]T_s}{L} - \frac{V_{out} d'[n]T_s}{L} \quad (11)$$

Combining equations (10) and (11) we get:

$$\tilde{i}(n+1) = \left(i(n-1) + \frac{V_{in}d[n]T_s}{L} - 2\frac{V_{out}T_s}{L} + \frac{V_{in}d[n+1]}{L}\right)d[n+1] \quad (12)$$

The prediction for the duty cycle d[n+1] can now be obtained based on the values sampled in the previous switching period. Denoting the sampled current as $i_s[n]$, and substituting the control objective $\tilde{i}(n+1)=I_{ref}$ in (11), we have:

$$0 = d^2[n+1]*\frac{V_{in}T_s}{L} + d[n+1]\left[i(n-1) + \frac{V_{in}d[n]T_s}{L} - 2\frac{V_{out}T_s}{L}\right] - I_{ref} \quad (13)$$

Equation (13) is the control law when the converter is in buck mode. Because of the fact that this equation is a quadratic equation, one of the methods of solving it in an efficient manner is to use Newton Raphson method to approximate the solution.

If we denote $T_i$ as the beginning time of each switching cycle (i), the above method samples the input voltage, output voltage, and inductor current at time $T_0$, utilizes the time until $T_1$ to predict the inductor current at $T_1$ using the input voltage, output voltage and the knowledge of the inductor inductance, and calculate the needed duty-cycle in order to reach the desired input current ($I_{ref}$) at $T_2$, that is dependent on the inductor current and the duty cycle at $T_2$, and set that duty cycle to be performed in the switching cycle between $T_1$ and $T_2$.

Predictive Buck Input Current Control—Alternative Embodiment

Figure 5:
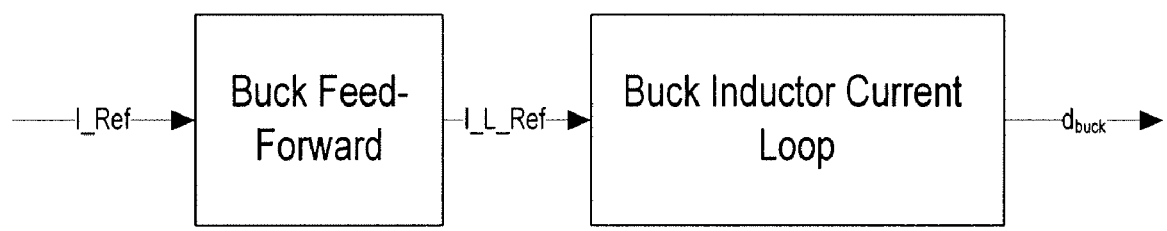
FIG. 5 illustrates a block diagram of predictive buck input current control, according to embodiment of the invention.

Another method for controlling the converter's input current in a buck converting is by controlling the inductor current and using the converter's input and output voltage to set the correct inductor reference value in an adaptive manner. FIG. 5 shows the block diagram of the control loops for this method. Equation 14 holds true in steady state in a buck converter:

$$\tilde{i}_{in} = \frac{V_{out}}{V_{in}}\tilde{i}_L \quad (14)$$

By using equation (14) we can set the required inductor current ($I_{L\_Ref}$) according to $V_{in}$ and $V_{out}$ in the following way:

$$I_{L\_Ref} = I_{ref} * \frac{V_{in}}{V_{out}} \quad (15)$$

Equation (15) is the feed-forward block that runs every switching cycle. After calculating the cycle-by-cycle inductor current reference, an inductor current loop is used to set the required inductor current.

Predictive Buck Inductor Current Control

By using equation (11), extending it for two switching cycles and replacing i(n) with $i_{pred}(n)$ we get the following equation:

$$i(n+1)i_{pred}(n) + \frac{V_{in}d[n+1]T_s}{L} - \frac{V_{out}T_s}{L} \quad (16)$$

By solving equation (16) for d[n+1] we get:

$$d[n+1] = (I_{L\_ref} - I_{pred}[n])\frac{L}{T_s * V_{in}} + \frac{V_{out}}{V_{in}} \quad (17)$$

Because of the fact that the inductor inductance can vary and to be able to achieve a slower control loop, we modify equation (17) with a variable gain that can be pre-adjusted, and we get:

$$d[n+1] = (I_{L\_ref} - I_{pred}[n])\frac{L*K}{T_s * V_{in}} + \frac{V_{out}}{V_{in}} \quad (18)$$

Equation (18) is the control law for the buck inductor current loop.

If we denote $T_i$ as the beginning time of each switching cycle (i), the above method samples the input voltage, output voltage, and inductor current at time $T_0$, utilizes the time until $T_1$ to estimate the needed inductor current ($I_{L\_Ref}$) according to the input voltage, output voltage and desired input current ($I_{ref}$). In addition, predicting the inductor current at $T_1$ using the input voltage, output voltage and the knowledge of the inductor inductance, and calculate the needed duty-cycle in order to reach the needed inductor current ($I_{L\_ref}$) at $T_2$, and set that duty cycle to be performed in the switching cycle between $T_1$ and $T_2$.

Predictive Cascaded Buck-Boost Input Current Control

When the converter is in buck-boost mode all four switches are being used to set the correct converter's average input current. This can be shown in FIG. 6 for trailing triangle PWM modulation. Switches B and D are complementary to switches A and C respectively. In each switching cycle both the buck and boost switches are being used to control the converter's average input current. In general, the boost switches will operate at a low duty cycle while the buck switches will operate at a high duty cycle.

Figure 6:
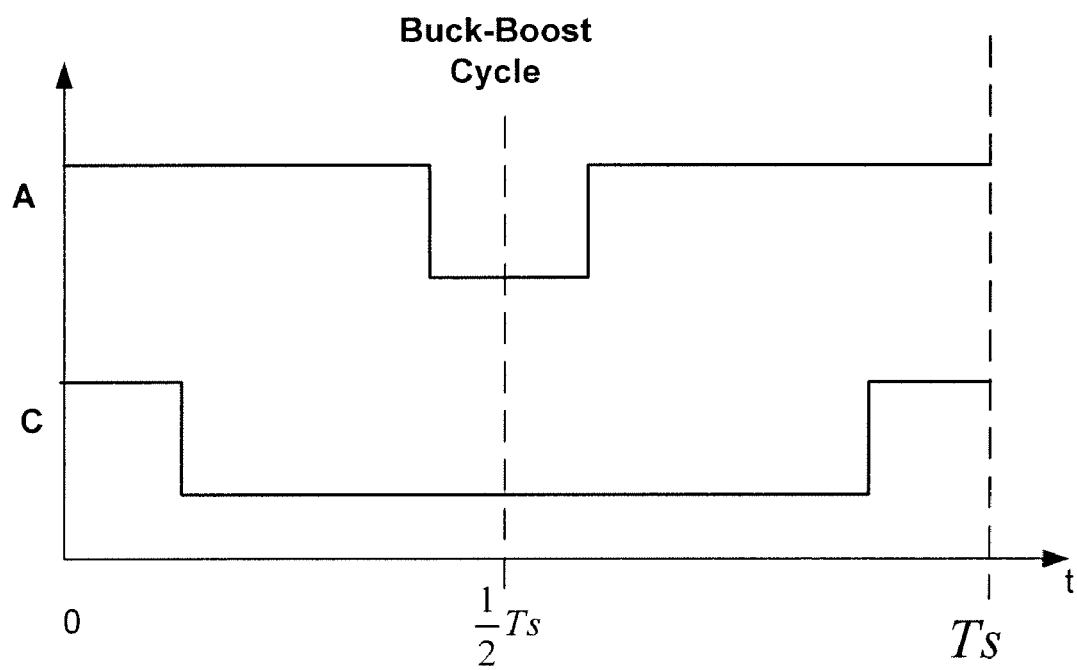
FIG. 6 illustrates the inductor current waveforms for a buck-boost switching cycle.

FIG. 6 illustrates a method enabling the converter to set the converter's average input current correctly when the output current is relatively close to the reference current. In order to simplify the control loop the buck duty cycle will be fixed to a value, $d_{buck}$, and the control loop will set the boost duty cycle every switching cycle.

Figure 7:
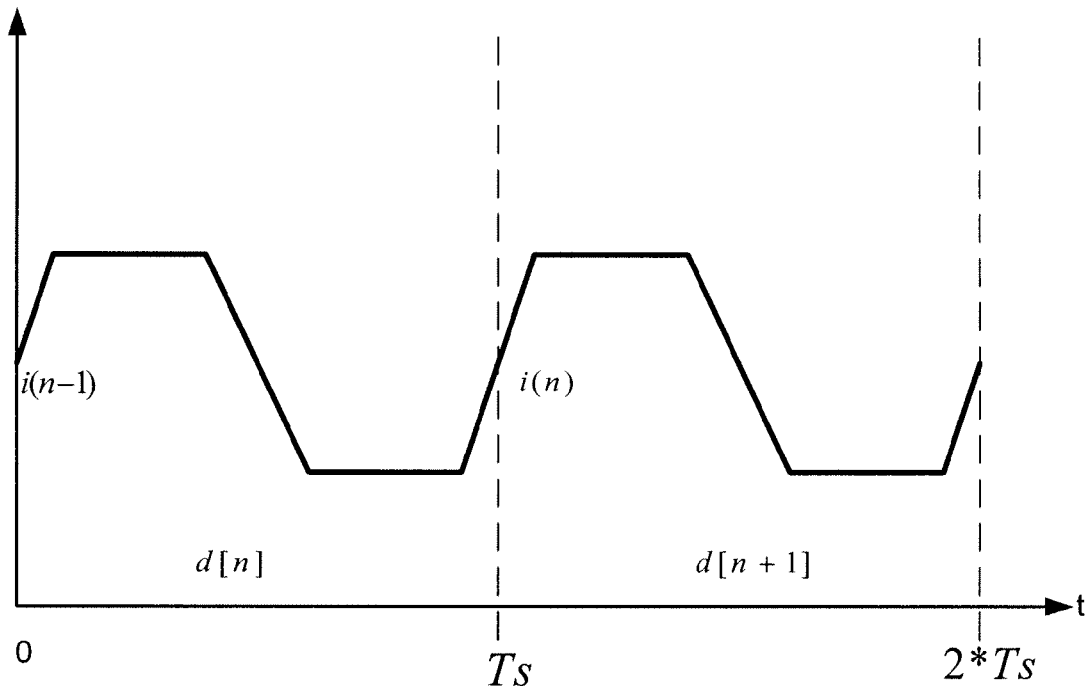
FIG. 7 illustrates the inductor current waveforms for a buck-boost switching cycle according to embodiment of the invention.

FIG. 7 illustrates the inductor current waveforms for a buck-boost switching cycle. The on-time and off-time inductor current slopes for the buck cycle and boost cycle are identical to the equations in (8), (9) and (1), (2). In addition, the average input current can be calculated from the average inductor current with the following equation:

$$\tilde{I}_{In} = \tilde{I}_L * d_{buck} \quad (19)$$

Based on all these equations the predictive control law can be built for calculating the required boost duty cycle:

$$\tilde{i}(n) = \left( i(n-1) + \frac{(V_{in} - V_{out})d_{buck}T_s}{L} - \frac{V_{out}d'_{buck}T_s}{L} + \frac{V_{in}d[n]T_s}{L} + \frac{(V_{in} - V_{out})d'[n]T_s}{L} \right) d_{buck} \quad (20)$$

Denoting the sampled current as $i_s[n]$ substituting the control objective $\tilde{i}(n) = i_{ref}$ in the equation above, and solving for $d[n]$, we get the following:

$$d[n] = 2 + \left( \frac{i_{ref}}{d_{buck}} - i_s[n] \right) \frac{L}{V_{out}T_s} - \frac{V_{in}}{V_{out}} d_{buck} \quad (21)$$

Equation (21) is the control law for setting the boost duty cycle when the converter is in buck-boost mode.

If we denote $T_i$ as the beginning time of each switching cycle (i), the above method samples the input voltage, output voltage, and inductor current at time $T_0$, utilizes the time until $T_1$ to predict the inductor current at $T_1$, based on the fact that the converter is in alternating buck-boost mode, using the input voltage, output voltage and the knowledge of the inductor inductance, and calculate the needed duty-cycle in order to reach the desired input current ($I_{ref}$) at $T_2$, and set that duty cycle to be performed in the switching cycle between $T_1$ and $T_2$.

Predictive Buck-Boost Input Current Control—Alternative Embodiment

Figure 8:
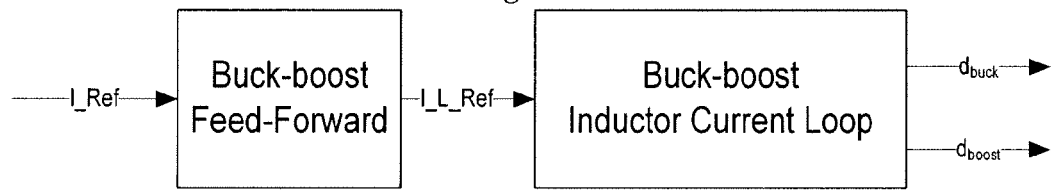
FIG. 8 shows a block diagram of control loops for buck-boost input current control, according to embodiment of the invention.

Another method for controlling the converter's input current in a cascaded buck-boost converting is by controlling the inductor current and using the input and output voltage to set the correct inductor reference value in an adaptive manner. FIG. 8 shows the block diagram of the control loops for this method.

Predictive Buck-Boost Inductor Current Control

An efficient method of controlling the inductor current in a cascaded buck-boost converter is setting a linear relation between the boost and buck duty cycle in the following manner:

$$d_{buck} = 1 - c + d_{boost} \quad (22)$$

Where:

$$0 \leq c \leq 1$$

Using equations (1), (2), (8) and (9) we can estimate the inductor at the end of switching cycle n:

$$i(n) = i(n-1) + \frac{(V_{in} - V_{out})d_{buck}[n]T_s}{L} - \frac{V_{out}d'_{buck}[n]T_s}{L} + \frac{V_{in}d_{boost}[n]T_s}{L} + \frac{(V_{in} - V_{out})d'_{boost}[n]T_s}{L} \quad (23)$$

$$i(n) = i(n-1) + \frac{V_{in}d_{buck}[n]T_s}{L} + \frac{V_{out}d_{boost}[n]T_s}{L} + \frac{(V_{in} - 2V_{out})T_s}{L}$$

Combining equations (22) and (23) and we get:

$$i_{pred}(n) = i(n) = i(n-1) + \frac{V_{in}d_{boost}[n]T_s}{L} + \frac{V_{out}d_{boost}[n]T_s}{L} + \frac{(V_{in}(2-c) - 2V_{out})T_s}{L} \quad (24)$$

By extending equation (24) to another switching cycle we get:

$$i(n+1) = i_{pred}(n) + \frac{V_{in}d_{boost}[n+1]T_s}{L} + \frac{V_{out}d_{boost}[n+1]T_s}{L} + \frac{(V_{in}(2-c) - 2V_{out})T_s}{L} \quad (25)$$

Solving equation (25) for $d_{boost}[n+1]$ and replacing $i(n+1)$ with the control objective, $I_{L\_Ref}$, we get:

$$d_{boost}[n+1] = (i_{L\_Ref} - i(n-1)) * \frac{L*K}{(V_{out} + V_{in})*T_s} - \frac{(V_{in}(2-c) - 2V_{out})}{V_{out} + V_{in}} \quad (26)$$

Equation (26) is the control law for the inductor current control in a cascaded buck-boost converter.

Feed Forward

In order to control the converter's input current, a cycle by cycle feed-forward is used in order to change the inductor current reference according to the required converter input current and input and output voltage. In a cascaded buck-boost converter we know that in steady state:

$$\frac{V_{out}}{V_{in}} = \frac{D_{buck}}{1 - D_{boost}} \quad (27a)$$

$$\frac{\tilde{i}_{in}}{\tilde{i}_l} = D_{buck} \quad (27b)$$

Using equations (27) and (22) we can get:

$$i_{L\_Ref} = i_{ref} \frac{V_{in} + V_{out}}{(2-c)V_{out}} \quad (28)$$

Using equation (28) we can set the required inductor current according to the desired input current and input and output voltages.

If we denote $T_i$ as the beginning time of each switching cycle (i), the above method samples the input voltage, output voltage, and inductor current at time $T_0$, utilizes the time until $T_1$ to estimate the needed inductor current ($I_{L\_Ref}$) according to the input voltage, output voltage and desired input current ($I_{ref}$). In addition, predicting the inductor current at $T_1$ using the input voltage, output voltage and the knowledge of the inductor inductance, and calculate the needed duty-cycle in order to reach the needed inductor current ($I_{L\_ref}$) at $T_2$, and set that duty cycle to be performed in the switching cycle between $T_1$ and $T_2$.

Switching Between Converter Modes

Figure 9:
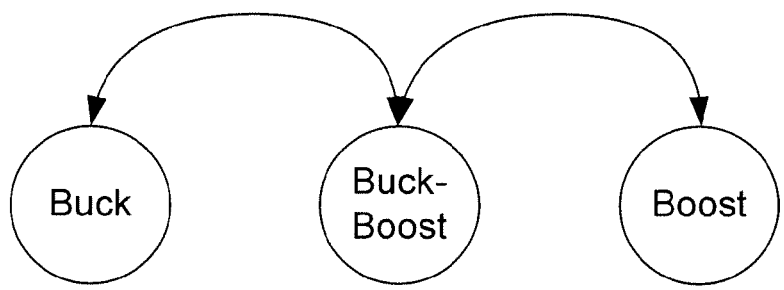
FIG. 9 shows a state diagram and the possible options to switch between the three different states.

The converter needs to switch between three different modes depending on the reference current and the output current. FIG. 9 shows a state diagram and the possible options to switch between the three different states. The following sections will describe the logic from switching between the different states.

Switching From Buck Mode

When in buck mode, the duty cycle will be monitored every switching cycle. If the duty cycle is higher than the threshold set, $0 < Th_{buck} < 1$, for more than $X_{buck}$ consecutive switching cycles the converter will switch to buck-boost mode.

Switching From Buck-Boost Mode

When in buck-boost mode, the duty cycle of the boost converter will be monitored every boost switching cycle (every second switching cycle). Two thresholds will be set— $Th_{high}$ and $Th_{low}$. If the duty cycle is higher than $Th_{high}$ for more than $X_{high}$ consecutive switching cycles the converter will switch to boost mode. If the duty cycle is lower than $Th_{low}$ for more than $X_{low}$ consecutive switching cycles the converter will switch to buck mode.

Switching From Boost Mode

When in boot mode, the duty cycle will be monitored every switching cycle. If the duty cycle is lower than the threshold set, $0 < Th_{boost} < 1$, for more than $X_{boost}$ consecutive switching cycles the converter will switch to buck-boost mode.

What is claimed is:

1. A method for switching between buck, boost, and alternating buck-boost modes of operation of a cascaded buck-boost converter, the converter comprising an inductor, the method comprising:

if the converter is in boost mode and the duty cycle drops below a predetermined value for at least a first predetermined number of cycles, transferring the converter to alternating buck-boost mode;

if the converter is in buck mode and the duty cycle climbs above a second predetermined value for at least a second predetermined number of cycles, transferring the converter to alternating buck-boost mode;

if the converter is in alternating buck-boost mode, and the duty cycle climbs above a third predetermined value for at least a third predetermined number of cycles, transferring the converter to boost mode, while if the duty cycle drops below a fourth predetermined value for at least a fourth predetermined number of cycles, transferring the converter to buck mode;

when the converter operates in a buck mode, controlling the input current according to a pre-programmed buck mode input current control;

when the converter operates in a boost mode, controlling the input current according to a pre-programmed boost mode input current control; and, when the converter operates in an alternating buck-boost mode, controlling the input current according to a pre-programmed buck-boost mode input current control.

2. A method for switching between buck, boost, and alternating buck-boost modes of operation of a cascaded buck-boost converter, wherein the converter comprises input terminals having input current and input voltage applied thereto and an inductor coupled to the input terminals, the method comprising:

if the converter is in boost mode and the duty cycle drops below a predetermined value for at least a first predetermined number of cycles, transferring the converter to alternating buck-boost mode;

if the converter is in buck mode and the duty cycle climbs above a second predetermined value for at least a second predetermined number of cycles, transferring the converter to alternating buck-boost mode;

if the converter is in alternating buck-boost mode, and the duty cycle climbs above a third predetermined value for at least a third predetermined number of cycles, transferring the converter to boost mode, while if the duty cycle drops below a fourth predetermined value for at least a fourth predetermined number of cycles, transferring the converter to buck mode;

when the converter operates in a buck mode, controlling the input current according to a pre-programmed buck mode input current control;

when the converter operates in a boost mode, controlling the input current according to a pre-programmed boost mode input current control; and, when the converter operates in an alternating buck-boost mode, controlling the input current according to a pre-programmed buck-boost mode input current control;

sampling current flowing in the inductor;

sampling the input voltage;

sampling output voltage output by the converter;

digitally predicting the input current in a subsequent cycle based on the sampled current in the inductor, the sampled input voltage, and the sampled output voltage according to one of the pre-programmed buck mode input current control, boost mode input current control, or buck-boost mode input current control; and controlling duty cycle needed for reaching the desired input current at a subsequent cycle.

3. A method for switching between buck, boost, and alternating buck-boost modes of operation of a cascaded buck-boost converter, wherein the converter comprises input terminals having input current and input voltage applied thereto and an inductor coupled to the input terminals, the method further comprising:

if the converter is in boost mode and the duty cycle drops below a predetermined value for at least a first predetermined number of cycles, transferring the converter to alternating buck-boost mode;

if the converter is in buck mode and the duty cycle climbs above a second predetermined value for at least a second predetermined number of cycles, transferring the converter to alternating buck-boost mode;

if the converter is in alternating buck-boost mode, and the duty cycle climbs above a third predetermined value for at least a third predetermined number of cycles, transferring the converter to boost mode, while if the duty cycle drops below a fourth predetermined value for at least a fourth predetermined number of cycles, transferring the converter to buck mode;

sampling current flowing in the inductor;

sampling the input voltage;

sampling output voltage output by the converter;

digitally predicting the input current in a subsequent cycle based on the sampled current in the inductor, the sampled input voltage, and the sampled output voltage; and controlling duty cycle needed for reaching the desired input current at a subsequent cycle.

4. The method of claim 3, wherein controlling duty cycle comprises performing a triangle pulse width modulation (PWM).

* * * * *